March 27, 1962 F. G. REICK 3,027,278
CARBON COATING
Filed April 22, 1957
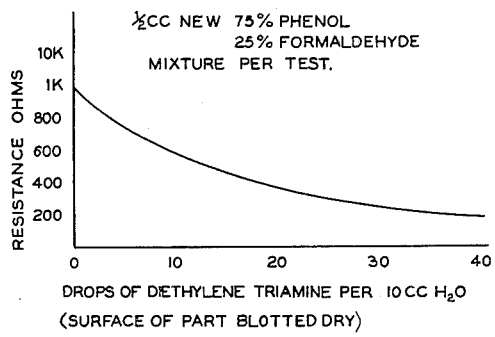
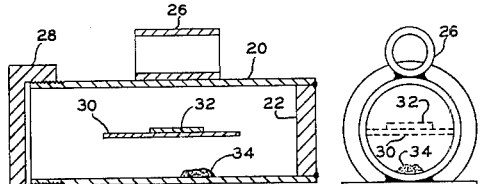
FIG. 1  FIG. 2
FIG. 3
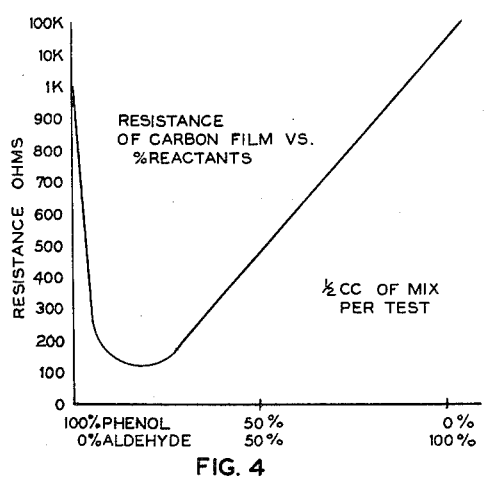
FIG. 4
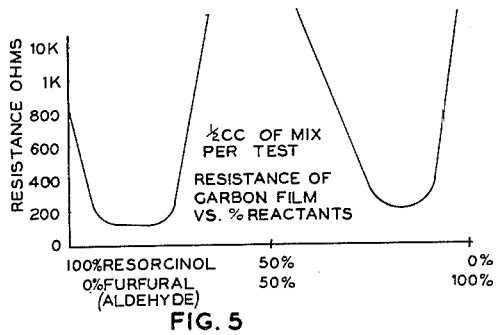
FIG. 5
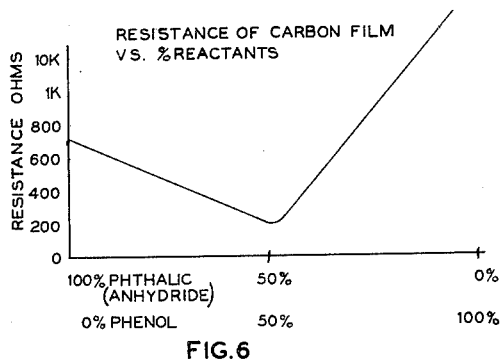
FIG. 6
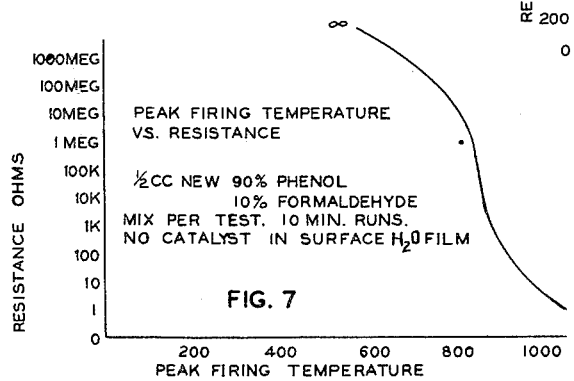
FIG. 7
| PEAK TEMP. | COLOR OF PART | RESISTANCE |
|---|---|---|
| 575 | DARK BROWN | ∞ |
| 775 | SHINY BLACK | 1000 MEG.Ω |
| 825 | GREY-BLACK | 25 MEG.Ω |
| 950 | GREY | 600 Ω |
INVENTOR.
FRANKLIN G. REICK
BY

3,027,278
CARBON COATING

Franklin G. Reick, Jamesville, N.Y., assignor to Diversified Technology, Inc., Syracuse, N.Y., a corporation of New York
Filed Apr. 22, 1957, Ser. No. 654,131
7 Claims. (Cl. 117—226)

This invention relates to carbon coating of surfaces, and the resulting coated surface, and more particularly to the application of a high polymer highly adherent film to metal, oxides, silicates and the like and which film can be carbonized.

The invention has to do with forming or depositing a high polymer organic film as a surface coating upon various materials, which film or coating has the unique property of being able to withstand high temperatures without flaking or peeling, the film tenaciously adhering to the coated material and imparting to the material a surface exhibiting the properties of carbon upon pyrolysis.

Heretofore, the carbon coating of various materials has involved treating the surface of the material to be coated to remove therefrom occluded water film and impurities, in an attempt to eliminate spurious catalytic effects during the coating process. The material to be coated was then heated to an elevated temperature, of, for example, 1000° C., and while so heated, exposed to the vapors of a suitable hydrocarbon gas, which cracked at the surface, depositing a carbon film thereon. The difficulties of such procedure lie in the necessity of maintaining a carefully controlled cracking temperature, to prevent the gas from breaking down in space, and forming soot rather than a film on the surface of the material. Thick films required long firing schedules, and such films as have been produced, have a tendency to peel and flake from the material unless the material be kept scrupulously clean and dry prior to firing. Such process is limited to the cracking temperature of the hydrocarbon gas, so that the process can only be used to coat materials capable of withstanding such temperature.

The present invention is directed to a method for depositing a film upon the surfaces of various materials by exposing the surfaces to the hot vapors of phenolic, alkyd or divinylbenzene type of monomers in such a manner that the vapors condense upon the material surface, are catalyzed at its surface, and polymerize or condense to form organic films possessing unusual properties. Desirable results are obtained when the material to be coated possesses a microscopic thin, surface liquid film in which the reacting materials are soluble. Catalysts preferably are incorporated in the thin film to control polymerization or condensation of the reactants. The surface films best suited to phenolic and alkyd reactants are hydrophilic, such as water or glycerine. The films best suited to divinylbenzene are hydrophobic of which benzene is an example. Catalysts that may be included in the surface film are preferably of a high boiling nature, for instance, diethylenetriamine for phenolic and alkyd monomers, and benzoyl peroxide for divinylbenzene.

The films so applied are stable at all temperatures, including temperatures in the range from approximately 300° C. to greater than 1,000° C. (barring oxidation). The film, which condenses upon the material to be coated at a relatively low temperature, can be heated to intermediate temperatures to obtain properties intermediate between an organic film and a carbon film. Low temperature films have a dark brown appearance. As pyrolysis is carried out, the color changes to shiny black, grey black and eventually to grey, as the film is converted completely to carbon. The characteristics of the film can also be engineered for specific properties by varying the strength and proportions of the catalysts and reactants. Films resulting from cross-linking at fairly low temperatures form hard, shiny black carbon deposits possessing poor electrical properties when carbonized. Films resulting from cross-linking at high temperatures form soft carbons of a grey appearance having good electrical properties and are believed to possess the classical crystallite structure familiar to those versed in the technology of carbon.

The reactants used to produce the films are liquids at room temperature and consequently can be safely and conveniently handled. They are to a considerable extent inexpensive and produced in vast quantities as basic raw materials for the plastics and chemical industry.

In order to illustrate one method of carrying out the process on a small scale, there is shown in FIGURE 1, a longitudinal sectional view of a small bomb, and in FIGURE 2 an end view of the bomb with the cap removed. In the remaining figures, the electrical resistance of the resultant surface coatings are plotted against concentration of reactants and/or catalysts; FIGURE 3 is a plot of resistance as against amine catalyst concentrations in the water film for a fixed concentration of phenol and for formaldehyde; FIGURE 4 is a curve showing resistance against varying ratios of phenol and formaldehyde; FIGURE 5 is a curve showing resistance against varying ratios of resorcinol and furfural; FIGURE 6 is a curve showing resistance against varying ratios of phthalic anhydride and resorcinol; and FIGURE 7 is a curve of resistance against peak firing temperatures.

In carrying out the process on a small scale experimentally, for example, an electric oven capable of continuous operation at 1000° C., utilizing a unit appropriately constructed for the purpose may be employed. A bomb, as shown in FIGURE 1, formed of a section of steel pipe 20, closed at one end by a plug 22 welded in place, is provided with a transverse foot 24 to support the bomb horizontally and prevent roll and a handle 26 to facilitate insertion of the bomb into the oven and its subsequentu removal. The bomb is closed at its other end by a loosely fitting threaded pipe cap 28, the threads of the pipe and cap being coated with colloidal graphite to prevent galling. A shelf in the form of a thin steel plate 30, for example, about .05" thick, is located within the pipe 20, upon which is supported the material 32 to be coated, while the reactants 34 to be vaporized are placed on the bottom of the pipe, where it may be subjected to rapid heating. Assuming the oven to be not large in respect to the size of the bomb, temperature may be measured by employing a thermo-couple located above the bomb, and below the roof of the oven. For experimental purposes on a small scale, the pipe may be an inch and a half in external diameter, and about six inches long.

The bomb may be subjected to repeated use, by cleaning with a wire brush before each run, to remove loose carbon particles, to assure uniformity of the internal surface of the bomb for all runs. Soot, carbon flakes, or new metal surfaces, tend to catalize the reactant mixture on the bottom surface of the bomb.

Material to be coated, if ceramic-like devitrified glass, is first sand blasted to roughen the surface to expose new glass to the reactants. The material is dipped in the water-catalyst solution, and blotted dry, leaving a microscopic film of water and catalyst on the surface. The material is then placed on the shelf with the roughened surface facing upward and exposed to the atmosphere within the bomb. Phenolic and alkyd reactants are pipetted on the bottom of the bomb, and the cap applied loosely by hand to avoid a gas-tight fit and any explosion hazard.

The closed assembly is then placed in the oven, which has been preheated to 1000° C., and then allowed to remain therein for about ten minutes. The introduction of the bomb into the oven will tend to cool the oven, and in the ten minute period, it will be sufficient if the oven temperature as indicated by the thermo-couple regains a temperature of 950° C. The bomb is then removed from the oven, and cooled in an air blast for about ten minutes, and the coated material removed.

In the heating of the bomb, the bottom of the bomb, upon which the reactants rest will heat rapidly and vaporize the reactants and thus surround the material to be coated in an atmosphere of condensable reactants. During such heating, the material to be coated will be relatively cool, as compared to the wall of the bomb, because of the lag in heat transfer from the bomb wall to the material, and for this reason the vapors condense upon the material under treatment.

The nature of the coating when applied to ceramics, may be conveniently evaluated and compared electrically by measuring the resistance between fixedly spaced point contacts approximately 1/8" apart, and the hardness and adhesion of the film will be at once apparent from scraping with a sharp knife edge. While the resistance measurements will afford a basis for comparison, such measurements do not give a complete picture, and can only be used when the process is used to coat materials initially non-conductive.

By controlling the concentration and type of reactants and catalysts employed, as well as the rate of heating, the polymer film or the subsequent carbon film, can be engineered to give specific desired properties. Excellent films are obtained from mixes cross-linking at low temperatures that possess poor electrical characteristics. When phenolics are employed, it is of importance that the mix and catalysts be such that cross-linking does not occur at the same time that water of condensation is splitting off and boiling away, in order to avoid producing a bubbly film lacking usefulness.

Films cross-linking at low temperatures can be obtained by reacting relatively high proportions of formaldehyde with phenol. These films when pyrolized to 950° C. produce heavy, shiny, black carbon films possessing poor electrical conductivity, unusual hardness, and excellent surface adhesion to the substrate.

Films cross-linking at high temperatures can be obtained by reacting relatively low concentrations of formaldehyde with phenol. These films when pyrolyzed are shiny, grey, relatively soft, and possess excellent electrical conductivity.

Referring to FIGURES 3–7 inclusive, the electrical characteristics of the applied film, insofar as conductivity or resistance is concerned, are employed to show the effect of variation in the factors controlling the process. Such characteristics can be easily measured for the purpose by using point contact probes, having uniform spacing. The information derived is limited, of course, to coatings, applied to non-conductors, but there is no reason to doubt that the characteristics are similar regardless of the nature of the material coated.

In FIGURE 3, there is shown the effect of varying the strength of the catalyst used in the thin water film, the curve showing the drop in electrical resistance of the carbon coating upon introduction of diethylene triamine in varying amounts. It is apparent that once the concentrations reaches 30 drops per 10 cc. of water, any further addition effects little change. In determining the effect of varying the strength of the catalyst, the reactants used were 1/2 cc. of a mixture of 75% phenol and 25% formaldehyde. All tests exposed the bomb to ten minutes in the oven during which time the temperature as indicated by the pyrometer returned to about 950° C.

In FIGURE 4, there is shown the effect of varying the ratio of phenol, and formaldehyde with diethylene triamine used as a catalyst in the surface water film. As before 1/2 cc. of the mixture, the ratio of reactants of which varied from 0% to 100% was used. The curve shows that when phenol only is used the resistance is high, and that the addition of relatively small quantities of reactive aldehydes causes a very signficant change in the resistance of the final carbon film. This can only be explained by the fact that a phenol-aldehyde condensation reaction has taken place on the surface of the part forming a high molecular weight polymer film, which was carbonized, thereby giving low electrical resistance.

Various combinations of phenol and aldehydes may be employed. For example, phenol, hydroquinone, resorcinol, pyrogallic acid and beta-naphthol can be reacted with any of the aldehydes such as formaldehyde, acetaldehyde, benzaldehyde and furfural. Generally any combination of one of the above phenols with an aldehyde produces results similar to that shown in FIGURE 4. In the case of hydroquinone, it was found that excellent films could be obtained without the addition of aldehydes. However, it was necessary that the catalyst be present in the water, the catalyst, for example, being diethylene triamine. This demonstrates that a condensation reaction of a single reactant with a catalyst may produce good organic or carbon films.

In FIGURE 5 there is shown the reactants resorcinol and furfural. It will be seen that very small quantities of either, when mixed with the other produce low resistance carbon films, whereas when the ratio approaches equal quantities, the reaction between the reactants becomes so uncontrollable that the polymerization products do not vaporize. Such film as is deposited on the substrate is so thin as to be of no benefit. Pyrogallol when reacted with aldehydes behaves similarly.

In FIGURE 6 is shown the reaction of phthalic anhydride and phenol which shows a typical condensation reaction similar to that of FIGURE 4. The reaction products of phenols and phthalic anhydride are dye intermediates, and generally not employed in the production of resins or polymers, although it will be seen from the curve that high polymer films can be formed from these materials under suitable conditions. Polymer films, and the subsequent carbon films can be formed by using phthalic anhydride and glycerol, with a catalyst such as diethylene triamine. It is possible to trigger these reactions by using a trace of an active phenol such as resorcinol and pyrogallol, with or without diethylene triamine.

FIGURE 7 is a plot of resistance versus peak firing temperature for 90% phenol 10% formaldehyde films. It shows that the films produced have high electrical resistance until peak temperature of approximately 700° C. are reached. As higher temperatures are employed the resistance drops rapidly to the 950° C. point which is the temperature used in the runs from which the preceding curves were derived. The great resistance change is attributed to the thermal removal of peripheral hydrogen atoms from the polymer films and the subsequent reorientation of the molecules into condensed carbon crystallites.

A table of peak temperature and appearance of the film has been included. The film varies from dark brown to black and grey as the peak temperature is increased. This also shows that useful plastic films can be obtained at the lower temperatures.

While reference to diethylene triamine as a catalyst has been made, sulphuric acid, and potassium silicate as well as other catalysts may be employed. These are hydrophilic, and the phenols and aldehydes referred to, as well as phthalic anhydride and glycerol are also hydrophilic. In general it has been found that hydrophilic catalysts react with hydrophilic reactants, such as those referred to.

A substrate that does not coat readily with the organic polymer or subsequent carbon film can have its coatability enhanced by treatment with a hydrophilic wetting agent such as liquid silicate, for example, sodium or potassium silicate, followed by air drying. The previously described hydrophilic coating systems may be employed with suitable catalysts and reactants in the manner described.

A polymer film or the subsequent carbon film can also be formed by employing a hydrophobic system, as, for example, when the substrate is wetted with benzene or toluene instead of water and in which benzoyl peroxide is employed as a catalyst, and divinylbenzene used as the reactant.

The processes for forming vapor phase deposited high polymer carbon films set forth, have been used by me to coat many materials other than those referred to, as, for example, asbestos, silicon carbide crystals, quartz sand, lake sand, mica, aluminum oxide, glass fibres, diatomaceous silica, porcelain rods, glass plates, titanium oxide, Berl saddles, bentonite, wallastonite and other clays, sodium carbonate, steel, stainless steel, copper, finely divided gas phase silica and alumina, lavite, firebrick, silica fibres, quartz rods, and other materials.

Some uses for carbon or high polymer coated materials or particles referred to are to enable organic materials such as resins, rubber or the like to be bonded readily to glass fibres so coated, or to provide for the bonding of clay particles and the like so coated for use as reinforcing fillers in plastics, tires, etc. Ceramic rods and glass rods so coated form excellent resistors. Silicates and oxides so coated have their surfaces converted to carbides with suitable heat treatment. Silicon carbides and diamonds so coated afford better adherance to organic materials used in forming grinding wheels. Fertilizers in the form of small particles, when so coated have controlled solubility. Diatomaceous silica coated with carbon or high polymer films may act as improved filter aids as gas adsorbents and in decolorizing. Glass fibres so coated have their original surfaces protected from abrasion and thus original fibre strength is retained. Metal surfaces thus coated have imparted thereto improved corrosion resistance. Glass fibres, ceramics, etc. so coated show improved high temperature resistance.

It will be understood by those skilled in the art that changes and modifications may be made in the procedure set forth without departing from the scope and spirit of the invention, it being further apparent that the processes are applicable to the coating of materials for various industrial applications additional to those set forth by way of examples.

What is claimed is:

1. The method of applying to an inorganic surface a high polymer film, capable of being converted to carbon by heating, which comprises applying to the inorganic surface a layer of water containing an amine catalyst miscible therein and placing the surface in a suitable container, and subjecting said layer covered surface to phenol formaldehyde vapors soluble in said amine water treated surface and capable of forming a high cross-linked polymer film on solution therein, polymerizing said organic materials by the application of heat to form cross-linking polymers and subsequently pyrolyzing the film to convert the entire cross-linked film to carbon.

2. The method of applying to a surface a high polymer film, which comprises applying to the surface, a thin layer of water containing diethylenetriamine as a catalyst, subjecting said surface to the vapors of a mixture of phenol and an aldehyde soluble in said layer and capable of forming high polymers in solution therein, to condense said vapors in said layer and upon said surface, polymerizing said condensed vapors, and subsequently pyrolyzing the film to entirely convert the film to carbon.

3. The method of applying to a surface a high polymer film, which comprises applying to the surface, a thin layer of water containing not more than 15% diethylenetriamine by volume as a catalyst, subjecting said surface to the vapors of a mixture in the order of one to five by volume of phenol and an aldehyde soluble in said layer and capable of forming high polymers in solution therein, to condense said vapors in said layer and upon said surface, polymerizing said condensed vapors, and subsequently pyrolyzing the film to entirely convert the film to carbon.

4. The method of applying to an inorganic surface, a high polymer film, capable of cross-linking and being converted to carbon by heating, which comprises applying to the inorganic surface a layer of water containing an amine catalyst miscible therein, placing said surface within a bomb centrally thereof, charging said bomb with a quantity of phenol formaldehyde soluble in said liquid and vaporizable on heating, and heating said bomb to a temperature in the order of 950° C. to vaporize and condense and polymerize and cross-link said organic materials upon said surface.

5. The method of applying to a surface, a high polymer film, capable of being converted to carbon by heating, which comprises wetting the surface with a layer of water containing diethylenetriamine as a catalyst, placing said wetted surface within a container, charging said container in the form of a bomb with a quantity of a mixture of a phenol and an aldehyde, and heating the contents of said container from the exterior thereof to vaporize said mixture and condense and polymerize a quantity thereof in said layer and upon said surface to form a high polymer film thereon, and increasing the heating of said container to about 950° C. to convert said film completely to carbon.

6. The method of applying to a surface, a high polymer film, which comprises applying to the surface, a thin layer of water, dissolving in said layer a catalyst from the following group, consisting of sulphuric acid, sodium silicate and diethylenetriamine, and exposing said surface and layer and catalyst to the vapors of at least one of the following group of phenols, consisting of, phenol, hydroquinone, resorcinol, pyrogallol and beta-naphthol, and to the vapors of at least one of the following group of aldehydes consisting of, formaldehyde, acetaldehyde, benzaldehyde and furfural, to condense said vapors in said layer, and heating to form a high polymer film, subsequently pyrolyzing said surface film to entirely convert the film to carbon.

7. The method of applying to a surface, a high polymer film, which comprises applying to the surface, a thin layer of water, dissolving in said layer a catalyst from the following group, consisting of sulphuric acid, sodium silicate and diethylenetriamine, exposing said surface and layer and catalyst to the vapors of glycerol and phthalic anhydride, and heating to form a high polymer alkyd type film and subsequently pyrolyzing said surface film to entirely convert the film to carbon.

References Cited in the file of this patent
UNITED STATES PATENTS

| | | |
|---|---|---|
| 1,160,363 | Backeland | Nov. 16, 1915 |
| 1,377,110 | Auzenat | May 3, 1921 |
| 1,593,579 | Kessler | July 27, 1926 |
| 2,143,618 | Booty et al. | Jan. 10, 1939 |
| 2,221,420 | Clarvoe et al. | Nov. 12, 1940 |
| 2,270,285 | Frolich | Jan. 20, 1942 |
| 2,688,566 | Arnold et al. | Sept. 7, 1954 |
| 2,740,728 | Sonnabend et al. | Apr. 3, 1956 |
| 2,809,901 | Bach | Oct. 15, 1957 |
| 2,876,133 | Iler et al. | Mar. 3, 1959 |